United States Patent
Roberts et al.

(10) Patent No.: US 12,047,427 B2
(45) Date of Patent: Jul. 23, 2024

(54) SYSTEMS AND METHODS FOR SYNCHRONOUS GROUP DEVICE TRANSMISSION OF STREAMING MEDIA AND RELATED USER INTERFACES

(71) Applicant: Discovery.com, LLC, New York, NY (US)

(72) Inventors: Brian F. Roberts, Dallas, TX (US); Chad Peltola, Fairfield, CT (US); Charles Robertson, Seattle, WA (US)

(73) Assignee: Discovery.com, LLC, New York, NY (US)

( * ) Notice: Subject to any disclaimer, the term of this patent is extended or adjusted under 35 U.S.C. 154(b) by 1 day.

(21) Appl. No.: 18/158,716

(22) Filed: Jan. 24, 2023

(65) Prior Publication Data

US 2023/0328119 A1    Oct. 12, 2023

Related U.S. Application Data

(63) Continuation of application No. 17/658,130, filed on Apr. 6, 2022, now Pat. No. 11,570,218.

(51) Int. Cl.
| | | |
|---|---|---|
| *G06F 15/16* | (2006.01) | |
| *H04L 65/1093* | (2022.01) | |
| *H04L 65/611* | (2022.01) | |
| *H04N 21/45* | (2011.01) | |
| *H04N 21/472* | (2011.01) | |

(52) U.S. Cl.
CPC ........ *H04L 65/1093* (2013.01); *H04L 65/611* (2022.05); *H04N 21/4532* (2013.01); *H04N 21/47202* (2013.01)

(58) Field of Classification Search
CPC .............. H04L 65/611; H04N 21/4532; H04N 21/47202; H04N 21/43076
See application file for complete search history.

(56) References Cited

U.S. PATENT DOCUMENTS

| | | |
|---|---|---|
| 6,577,622 B1 | 6/2003 | Schuster et al. |
| 9,503,496 B2 | 11/2016 | Rooks et al. |
| 10,625,156 B2 * | 4/2020 | Sherwani ................ A63F 13/35 |
| 2005/0181878 A1 * | 8/2005 | Danieli ............... G07F 17/3276 |
| | | 463/42 |

(Continued)

*Primary Examiner* — Hieu T Hoang
(74) *Attorney, Agent, or Firm* — Bookoff McAndrews, PLLC

(57) ABSTRACT

Systems and methods for providing synchronous transmission of streaming media are disclosed. One method may include: receiving, from a first user device associated with a first user, a request to invite a second user to a virtual media streaming session; retrieving, from the at least one database, a second user profile, the second user profile identifying a second user device associated with the second user; transmitting, subsequent to the retrieving, instructions to the second user device to present a notification alerting the second user of the request; determining, using a processor, whether a response accepting the request is detected from the second user device; and connecting, responsive to determining that the response accepting the request was detected, the second user profile to the virtual media streaming session; wherein multimedia content presented in the virtual media streaming session is simultaneously viewable on the first user device and the second user device.

20 Claims, 14 Drawing Sheets

(56) References Cited

U.S. PATENT DOCUMENTS

| | | | |
|---|---|---|---|
| 2007/0005406 A1 | 1/2007 | Assadian et al. | |
| 2008/0147471 A1 | 6/2008 | Singh et al. | |
| 2009/0157799 A1* | 6/2009 | Sukumaran | H04L 63/102 709/203 |
| 2010/0057516 A1 | 3/2010 | Goraly | |
| 2012/0117017 A1 | 5/2012 | Phillips et al. | |
| 2012/0290952 A1 | 11/2012 | Paluch | |
| 2014/0047023 A1 | 2/2014 | Baldwin et al. | |
| 2014/0136630 A1 | 5/2014 | Siegel et al. | |
| 2014/0297765 A1 | 10/2014 | Beckley et al. | |
| 2014/0313282 A1* | 10/2014 | Ma | H04N 7/141 348/14.09 |
| 2014/0372570 A1* | 12/2014 | Gupta | H04L 65/611 709/219 |
| 2015/0248426 A1 | 9/2015 | Che et al. | |
| 2015/0319205 A1* | 11/2015 | Fan | H04L 67/568 709/219 |
| 2015/0319509 A1* | 11/2015 | Huang | H04N 21/482 725/53 |
| 2016/0173683 A1* | 6/2016 | Abreu | H04M 3/42042 455/414.1 |
| 2016/0182935 A1* | 6/2016 | Augui | H04W 4/80 725/110 |
| 2016/0337213 A1 | 11/2016 | Deutsch et al. | |
| 2016/0358126 A1 | 12/2016 | Bostick et al. | |
| 2017/0091263 A1 | 3/2017 | Fredinburg et al. | |
| 2017/0312626 A1* | 11/2017 | Colenbrander | H04L 67/10 |
| 2018/0006994 A1 | 1/2018 | Baldwin et al. | |
| 2018/0007100 A1 | 1/2018 | Krasadakis | |
| 2018/0124136 A1* | 5/2018 | Faulkner | H04N 7/15 |
| 2018/0293550 A1 | 10/2018 | Liang et al. | |
| 2019/0037171 A1* | 1/2019 | Nagpal | H04N 7/147 |
| 2019/0089456 A1* | 3/2019 | Kasilya Sudarsan | H04N 7/185 |
| 2019/0141292 A1* | 5/2019 | Thakkar | H04L 12/1818 |
| 2019/0166330 A1* | 5/2019 | Ma | H04L 65/403 |
| 2020/0084057 A1* | 3/2020 | Wadhwa | H04M 3/563 |
| 2020/0244771 A1 | 7/2020 | Poulikakos et al. | |
| 2020/0327169 A1* | 10/2020 | Lewis | G06F 40/134 |
| 2021/0056860 A1 | 2/2021 | Fahrendorff et al. | |
| 2021/0136130 A1* | 5/2021 | Ponnusamy | H04L 12/1822 |
| 2021/0144021 A1* | 5/2021 | Casas | H04L 12/1827 |
| 2021/0266621 A1 | 8/2021 | Marten | |
| 2021/0385579 A1* | 12/2021 | Nesfield | H04R 5/04 |
| 2022/0070524 A1 | 3/2022 | Iyer et al. | |
| 2022/0191259 A1* | 6/2022 | Leppänen | G06F 3/0346 |
| 2023/0081041 A1* | 3/2023 | Lee | H04N 7/15 348/14.08 |

\* cited by examiner

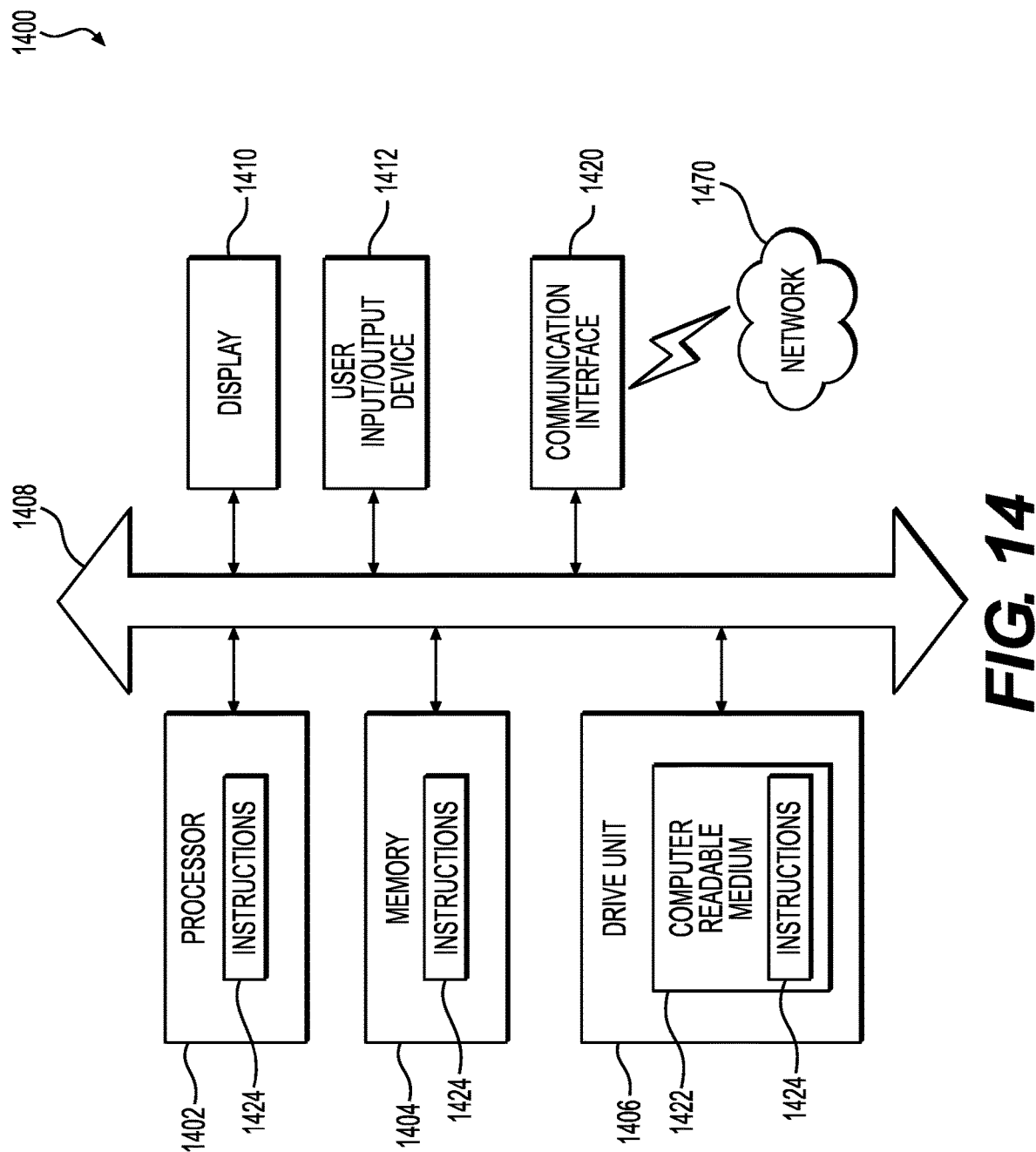

SYSTEMS AND METHODS FOR SYNCHRONOUS GROUP DEVICE TRANSMISSION OF STREAMING MEDIA AND RELATED USER INTERFACES

CROSS REFERENCE TO RELATED APPLICATION(S)

This patent application is a continuation of and claims the benefit of priority to U.S. Nonprovisional patent application Ser. No. 17/658,130, filed on Apr. 6, 2022, the entirety of which is incorporated herein by reference.

TECHNICAL FIELD

Various embodiments of the present disclosure relate generally to the field of multimedia content streaming and, more particularly, to enabling synchronous group transmission of streaming media to user devices using a media streaming application platform and related user interfaces.

BACKGROUND

With the rapid rise of at-home entertainment, many individuals may more easily access and interact with a vast array of multimedia content, such as television shows, films, documentaries, and the like, via, for example, subscription-based media streaming platforms. Individuals may have more control over the content they watch, how they watch it, and where they choose to watch it from. However, despite the many options and comforts that come with video streaming services, for some individuals, the content consumption experience may be isolating or limiting if they, for example, live alone or if their friends live far away. For others, the content consumption experience may be limited to a small group of people, such as, for example, the people they live with (e.g., roommates, family members).

One significant part of the multimedia consumption experience may be the ability to share one's viewing experience with other people. Enabling individuals to engage in a remote (e.g., virtual) shared viewing may allow individuals to open up and connect with one another as they take part in the same viewing experience. The present disclosure is accordingly directed to optimizing the shared viewing experience.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for enabling synchronous consumption of streaming media by a group of users.

In summary, one aspect provides a method for synchronous transmission of streaming media using a server in network communication with at least one database, the method comprising operations including: receiving, from a first user device associated with a first user, a request to invite a second user to a virtual media streaming session, the request identifying a first user profile associated with the first user and data associated with the second user; retrieving, from the at least one database and based on the data associated with the second user in the received request, a second user profile, the second user profile identifying a second user device associated with the second user; transmitting, subsequent to the retrieving, instructions to the second user device to present a notification alerting the second user of the request; determining, using a processor, whether a response accepting the request is detected from the second user device; and connecting, responsive to determining that the response accepting the request was detected, the second user profile to the virtual media streaming session; wherein multimedia content presented in the virtual media streaming session is simultaneously viewable on the first user device and the second user device.

Another aspect provides a system for synchronous transmission of streaming media, the system comprising: at least one database; a server in network communication with the at least one database, the server configured to perform operations including: receiving, from a first user device associated with a first user, a request to invite a second user to a virtual media streaming session, the request identifying a first user profile associated with the first user and data associated with the second user; retrieving, from the at least one database and based on the data associated with the second user in the received request, a second user profile, the second user profile identifying a second user device associated with the second user; transmitting, subsequent to the retrieving, instructions to the second user device to present a notification alerting the second user of the request; determining, using a processor, whether a response accepting the request is detected from the second user device; and connecting, responsive to determining that the response accepting the request was detected, the second user profile to the virtual media streaming session; wherein multimedia content presented in the virtual media streaming session is simultaneously viewable on the first user device and the second user device.

A further aspect provides a non-transitory computer-readable medium storing computer-executable instructions which, when executed by a server in network communication with at least one database, cause the server to perform operations including: receiving, from a first user device associated with a first user, a request to invite a second user to a virtual media streaming session, the request identifying a first user profile associated with the first user and data associated with the second user; retrieving, from the at least one database and based on the data associated with the second user in the received request, a second user profile, the second user profile identifying a second user device associated with the second user; transmitting, subsequent to the retrieving, instructions to the second user device to present a notification alerting the second user of the request; determining, using a processor, whether a response accepting the request is detected from the second user device; and connecting, responsive to determining that the response accepting the request was detected, the second user profile to the virtual media streaming session; wherein multimedia content presented in the virtual media streaming session is simultaneously viewable on the first user device and the second user device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 14 depicts an exemplary computing server, according to one or more embodiments.

DETAILED DESCRIPTION OF EMBODIMENTS

Figure 1:
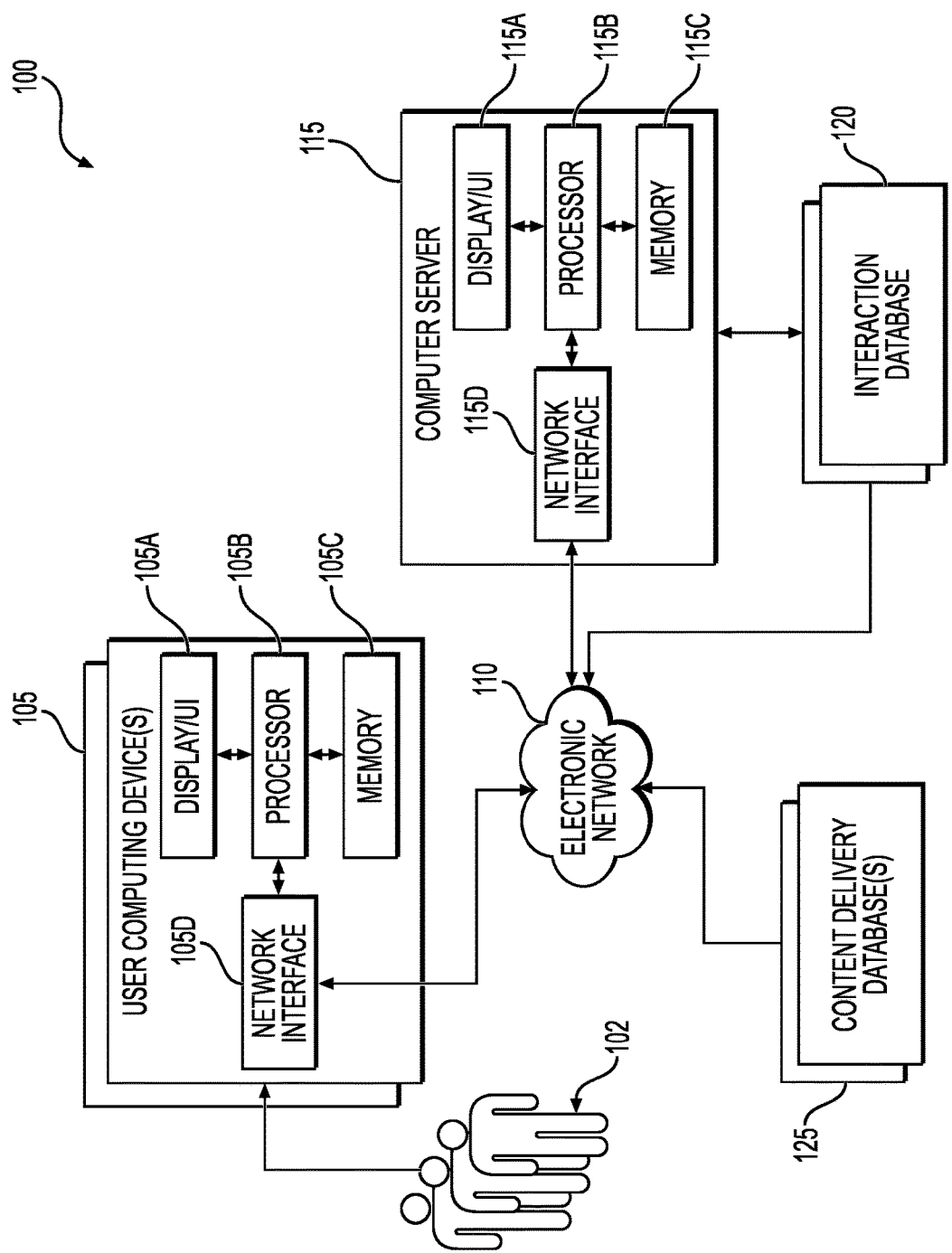
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "user", "subscriber," and the like generally encompasses consumers who are subscribed to a streaming service (e.g., streaming platform) associated with the system described herein. The term "streaming service" (e.g., streaming platform) may refer to subscription-based video-on-demand (SVoD) services such as television shows, films, documentaries, and the like. The term "user" may be used interchangeably with "user profile," "profile," and the like throughout this application. The phrase "linking users" may be used interchangeably with "linking user profiles" and the like throughout this application. The phrase "registered with" may be used interchangeably with "subscribed to" and the like throughout this application. The phrase "multimedia content" or "media content" may be used interchangeably with "multimedia content item" and the like throughout this application.

In the following description, embodiments will be described with reference to the accompanying drawings. As will be discussed in more detail below, in various embodiments, systems and methods for synchronous group consumption of streaming media are described.

Application platforms exist today that attempt to duplicate the real-life group-based viewing experience. More particularly, many popular media-streaming services provide users with an option to view multimedia content with one or more other individuals in a virtual setting. Participants involved in this shared experience may each view the same article of media content substantially simultaneously (i.e., using their own electronic devices) and may each provide input (e.g., comments, reactions, etc.) that the other participants may see. Such a feature may ultimately improve an individual's content consumption experience by providing a social component that they otherwise would not have by streaming media using conventional means.

Issues exist, however, in the implementation of certain synchronous media-streaming groups. For example, some media-streaming platforms do not support synchronous group streaming. In these situations, individuals may need to download one or more third party applications that both enable synchronous group streaming and that are compatible with the individuals' desired media-streaming platform, a process which may be time-consuming and burdensome. In another example, some media-streaming platforms do not have the synchronous group streaming option enabled across all applications and/or devices (e.g., desktop or web, mobile, connected TV (CTV), etc.). These limitations may make it difficult, if not impossible, for an individual to begin a synchronous group streaming session on one device, such as their television, and then transition to another device, such as their phone or tablet, during the same session. In yet another example, some techniques for inviting others to a synchronous group streaming session, as well techniques for responding to such an invite, may not be intuitive and may turn some individuals away from engaging in a shared viewing experience.

To address the above-noted problems, the present disclosure describes a synchronous group streaming system that enables users to easily invite one or more other individuals to join a virtual "watch party" where they can synchronously view and react to multimedia content in a virtual media streaming "session." Hosts of the virtual media streaming session may be provided with numerous party options that they can leverage to tailor the shared viewing experience to the group's wishes. Additionally, the synchronous group streaming system may also provide users the ability to easily transition the virtual media streaming session from one device to another.

In an exemplary use case, a server associated with the synchronous group streaming system may receive a request from a first user's profile (a "host") to invite one or more other individuals to a virtual media streaming session. The virtual media streaming session may be a digital space in which groups of individuals may virtually gather to synchronously view multimedia content (e.g., video series, movies, documentaries, live event broadcasts, etc.). In the context of this application, "synchronous viewing" refers to a situation in which an article of multimedia content is viewed simultaneously by each member in the viewing party. Specifically, a chosen multimedia stream may be simultaneously presented on devices associated with each user profile connected to the virtual media streaming session. Additionally, any comments or reactions (e.g., emoticons reactions, like or dislike reactions, etc.) provided by an attendee in the virtual media streaming session may be presented to some or all other attendees. In an embodiment, the host may be provided with a number of controls that they can leverage to improve the shared viewing experience. For instance, the host may be enabled to choose: the multimedia content to be viewed, how the multimedia content can be viewed (e.g., in the case of a video series whether to watch episodes chronologically or on shuffle), the individuals to invite to the virtual media streaming session, the invitees that can invite other individuals, a scheduling option for future iterations of the synchronous viewing experience, and the like.

In an embodiment, the invite request may contain an indication of the host's profile as well as identifying data associated with each of the invitees (e.g., the user profiles associated with each of the invitees, etc.). An invite recipient may receive a notification of the invite (e.g., a push notification presented on a portion of a display of their device, an audible notification provided through speakers associated with their device, a combination thereof, etc.) that may contain an indication of: the identity of the host, the nature of the invite (i.e., that it is an invite to a shared viewing experience), the identity of other attendees, and/or aspects of the article of multimedia content to be viewed in the virtual media streaming session (e.g., the name of the multimedia article, the type of multimedia article, etc.). In an embodiment, an invite recipient may choose to accept or deny the invite request. With respect to the former, upon acceptance of the invite, a user profile associated with the invite recipient may be connected to the virtual media streaming session. In this regard, the user profile of the invite recipient may be transported to the virtual media streaming session, or a lobby associated therewith, and the contents of the display screen of the device associated with the invite recipient may be correspondingly updated (i.e., with the shared multimedia content of the virtual media streaming session). With respect to the latter, a denial of the invite may simply allow an invite recipient to continue doing what they were doing on the application platform. Additionally or alternatively, the host may receive a notification that the invite recipient has denied their invite request.

In an embodiment, options exist in the virtual media streaming session that may allow any of the participants to either fully transition the shared viewing experience to a different device or to load some or all of the features of the virtual media streaming session onto another device. For example, a host that initiates the virtual media streaming session on their television may later load the virtual media streaming session on their laptop. In another example, a participant may offload engagement (i.e., chat functionality) to the virtual media streaming session to another device. This may allow the participant to continue viewing the shared multimedia content on a first device (e.g., a television) while enabling them to provide input to the virtual media streaming session using another device (e.g., their smart phone).

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

FIG. 1 is a diagram depicting an exemplary block diagram of a system environment 100 for enabling synchronous group transmission of multimedia content to devices of at least two users, according to one or more embodiments of the present disclosure. The system environment 100 may include two or more user computing devices 105 operated by users 102, an electronic network 110, a computer server 115, an interaction database 120, and one or more content delivery databases 125. One of skill in the art would recognize that the server 115 may configure the one or more user computing devices 105 so as to experience different functionalities and/or have access to different information (e.g., determined by credentials such as user ID/password).

The user computing devices 105, the server 115, the interaction database 120 and/or the content delivery databases 125 may be connected via the network 110, using one or more standard communication protocols. The server 115 may be configured to receive data over the network 110 from the user computing devices 105, including, but is not limited to, requests to invite others to a shared viewing experience in a virtual media streaming session (e.g., invite requests) and responses to the invite requests. "Interaction data" includes data received from the user computing devices 105 as well as data generated and analyzed by the computer server 115. Interaction data may be stored in the interaction database 120, and may include information as to which users/user profiles are present in a virtual media streaming session, the multimedia content (e.g., movies, shows, documentaries) presented in the virtual media streaming session, communications (e.g., reactions, comments, favorites) shared between users in the virtual media streaming session while watching the shared content, and notifications generated and transmitted by the computer server 115 to users. The server 115 may store the interaction data received over the network 110 in the interaction database 120.

In one or more embodiments, the computer server 115 and the interaction database 120 may be one server computer device and a single database, respectively. Alternatively, in one or more embodiments, the server 115 may be a server cluster, or any other collection or network of a plurality of computer servers. The interaction database 120 also may be a collection of a plurality of interconnected databases. The server 115 and the interaction database 120 may be components of one server system. Additionally, or alternatively, the server 115 and the interaction database 120 may be components of different server systems, with the network 110 serving as the communication channel between them. The computer server 115, the interaction database 120, and/or the content delivery databases 125 may be associated with an entity 130, such as a subscription-based streaming service provider (not shown). In some embodiments, the computer server 115, the interaction database 120, and/or the content delivery databases 125 may collectively be referred to as an entity system.

As shown in FIG. 1, the computer server 115 may be in communication with the user devices 105 to transmit and receive messages from each other across the network 110. The user devices 105 may be associated with users who are subscribed to a streaming service platform provided by the computer server 115. The network 110 may comprise one or more networks that connect devices and/or components of environment 100 to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, the network 110 may be implemented using cell and/or pager networks, satellite, licensed radio, or a combination of licensed and unlicensed radio. The network 110 may be associated with a cloud platform that stores data and information related to methods disclosed herein.

The user computing device 105 may include a display/user interface (UI) 105A, a processor 105B, a memory 105C, and/or a network interface 105D. The user computing device 105 may be a personal computer (PC), a tablet PC, a set-top box (STB), a streaming device (e.g., Apple TV®, Amazon Fire®, Roku® player, Google Chromecast®), a television (TV), a smart TV, a gaming console, a personal digital assistant (PDA), a mobile device, a palmtop computer, a laptop computer, a desktop computer, etc. The user computing device 105 may execute, by the processor 105B, an operating system (O/S) and at least one application (each stored in memory 105C). The application may be a browser program or a mobile application program (which may also be a browser program in a mobile O/S). The application may generate one or more interactive graphic user interfaces (GUIs), such as, for example, the exemplary GUIs shown in FIGS. 3-12, based on instructions/information received from the server 115. In some embodiments, the application may generate one or more interactive GUIs based on instructions/information stored in the memory 105C. The interactive GUIs may be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application.

The computer server 115 may include a display/UI 115A, a processor 1156, a memory 115C, and/or a network interface 115D. The server 115 may be a computer, system of computers (e.g., rack server(s)), and/or or a cloud service computer system. The server 115 may execute, by the processor 1156, an operating system (O/S) and at least one instance of a server program (each stored in memory 115C). The server 115 may store or have access to information from interaction database 120 and content delivery databases 125. The display/UI 115A may be a touch screen or a display with other input systems (e.g., mouse, keyboard, etc.) for an operator of the server 115 to control the functions of the server 115 (e.g., update the server program and/or the server information). The network interface 115D may be a TCP/IP network interface for, e.g., Ethernet or wireless communications with the network 110. The server program, executed by the processor 115B on the server 115, may be configured to identify interaction partners that align with a user's mission(s) of interest, as will be described in further detail below.

As described above, the interaction database 120 may store data associated with users subscribed to a streaming service platform associated with the computer server 115. In addition to the interaction data, the interaction database 120 may also store additional data received from user computing devices 105, including real time and/or near real time location data (e.g., GPS data) of the user computing devices 105. The interaction database 120 may also store recommendations generated by the computer server 115, such as recommendations for a user to watch a certain show, movie, and/or other multimedia content based on the past viewing activity (e.g., viewing history) of other user(s) to which the user is linked to (e.g., that a user is friends with on the streaming platform).

The interaction database 120 may also store user profiles generated by the computer server 115 for the users 102. In some embodiments, the information described above, including the interaction data and any additional data received from user computing devices 105, may be stored in a plurality of user profiles within the interaction database 120. Each user profile may correspond to each user 102 in communication with the server 115. A user 102 may have multiple user computing devices 105 registered with the server 115 based on the user's 102 viewing habits and/or preferences. For example, one user may register a personal laptop, a smart TV, and a mobile device with the server 115. Information associated with registered user computing device(s) 105 and the user's 102 viewing habits and/or viewing preferences may all be stored within the user's user profile.

In some embodiments, in addition to the interaction data, each user profile may also include information associated with a respective user and their user computing device(s) 105 (e.g., a device identifier, device type), the user's name, a username or a nickname provided by the user for the user profile, content viewing preferences provided by the user, recommendations provided to the user by the server 115, the user's past viewing activity, IP addresses and locations (as well as accompanying dates and times) from where the user has logged in from, and/or user analytics generated by the server 115. In these embodiments, the user profiles may be updated to reflect a corresponding user's recent activities with another user, including sending or accepting an invite request.

In the system environment 100, the computer server 115 may retrieve multimedia content requested by users from the content delivery databases 125 to enable requested content to be streamed by users on the user computing devices 105. The content delivery databases 125 may store volumes of multimedia content items, including, for example, video series, movies, documentaries, and additional programming content that may be streamed by users 102 on the user computing devices 105. In some embodiments, the content delivery databases 125 may be maintained by third party content providers. In other embodiments, the content delivery databases 125 may be maintained by the server 115 and/or additional servers associated with the server 115.

Figure 2:
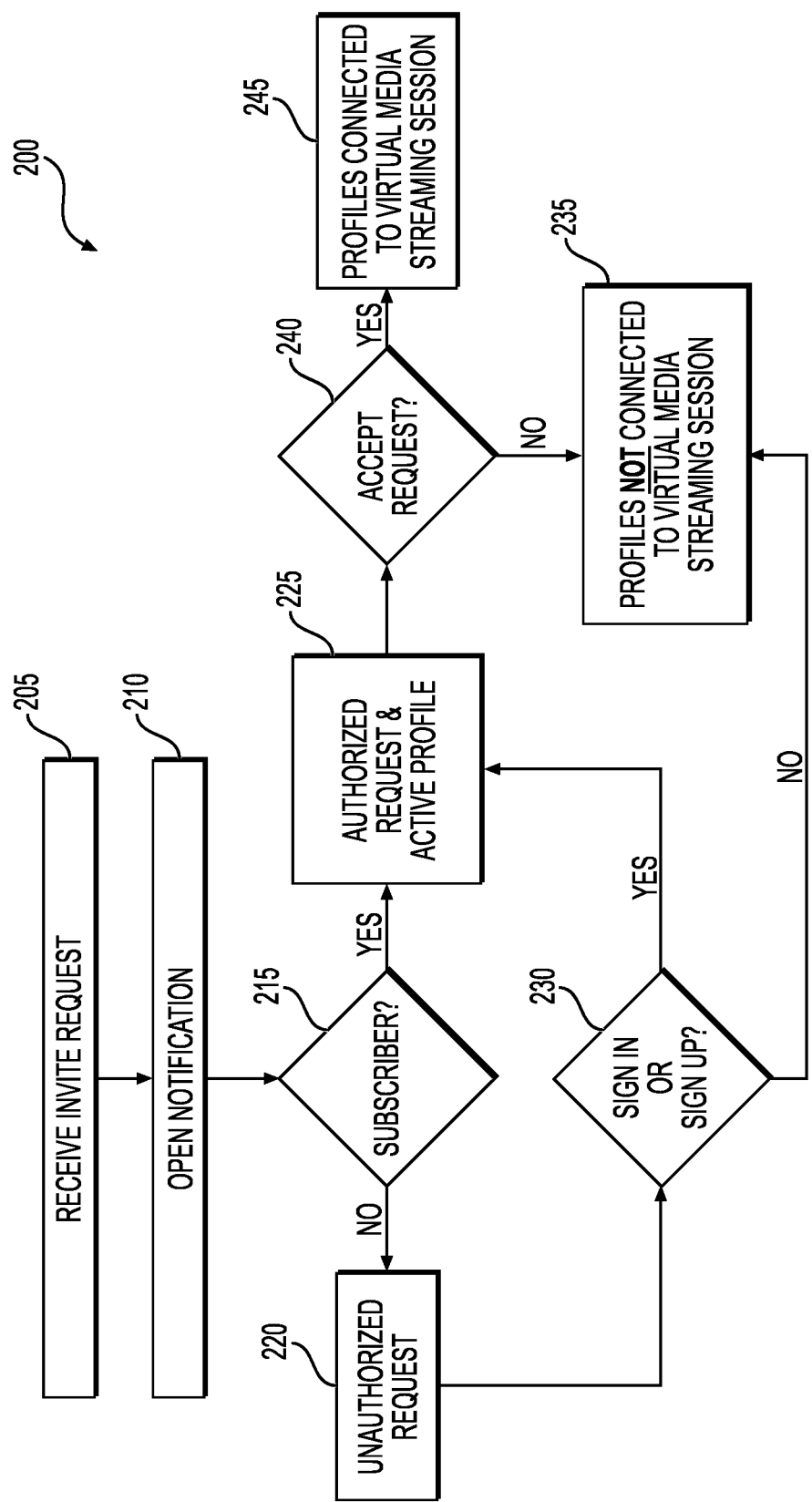
FIG. 2 depicts an exemplary process flow for inviting users to a "virtual watch party," enabling synchronous transmission of content to a group of user devices, according to one or more embodiments.

FIG. 2 depicts an exemplary process flow 200 for initiating a watch party in a virtual media streaming session, according to one or more embodiments of the present disclosure. By connecting two or more user profiles of a streaming service platform to a virtual media streaming session, the computer server 115 enables the connected users to synchronously experience multimedia content together in a shared viewing experience, each on their own computing device 105. The exemplary process flow 200 may be implemented by system environment 100, which includes user computing devices 105 associated with users 102, computer server 115, interaction database 120, and content delivery databases 125 (all shown in FIG. 1).

At block 205, a first user (e.g., "user A") transmits an invite request (e.g., an invitation) to a second user (e.g., "user B"). User B may be a designated "friend" or "contact" of user A on the streaming service platform whose profile may be easily accessible to user A via navigation through a "friends list." The invite request described in FIG. 2 is an invitation from user A to user B to join a virtual media streaming session, and more specifically, to be connected in a shared multimedia viewing experience via computer server 115. The invite request may be transmitted from user A's user computing device 105, and may identify a user (e.g., "user B") with whom user A wishes to invite to the virtual media streaming session. In various embodiments, as described below with reference to FIG. 8-9, the invite request may identify one or more of: the user profile associated with the inviting user, an indication of the multimedia content item to be synchronously viewed in the virtual media streaming session, other invitees to the virtual media streaming session, and the like.

At block 210, user B may receive an alert notification alerting them of the invite request. For example, the alert notification may manifest as a push notification that is presented on a portion of user B's display. As another example, the notification may be a text message (e.g., SMS message, MMS message, etc.) or an email including a URL from user A to access the virtual media streaming session. In these embodiments, when user B clicks or selects the customized URL, the computer server 115 may determine whether user B is a subscriber to the content streaming service platform, as shown at block 215.

In FIG. 2, user A is a subscriber of the content streaming service platform associated with computer server 115. At block 215, the computer server 115 may query interaction database 120 to determine whether user B is also a subscriber. For example, the share request may include a user identifier associated with user B. In this example, the computer server 115 may use this user identifier to query the interaction database 120 to locate a user profile associated with user B within the interaction database 120. If a user profile associated with user B is found within the interaction database 120, the computer server 115 may determine that user B is subscribed to the content streaming service platform, and accordingly, is registered with the computer server 115. If a user profile associated with user B cannot be found within the interaction database 120, the computer server 115 may determine that user B is not subscribed to the content streaming service platform, and accordingly, is not registered with the computer server 115. For example, the invite request may include an identifier that does not return a user profile for user B or the share request may otherwise not include an identifier for user B.

In FIG. 2, if user B is determined to be a subscriber at block 215, then exemplary process flow 200 proceeds to block 225, where the invite request is authorized by the computer server 115, and where the computer server 115 determines that an active user profile exists for user B. If at block 215, the computer server 115 determines that user B is not a subscriber to the content streaming service platform at block 215, then exemplary process flow 200 proceeds to block 220, where the invite request is determined to be an unauthorized request. At block 230, the computer server 115 may prompt user B to sign into the content streaming service platform if user B is an existing subscriber or to sign up for the content streaming service platform as a new subscriber. If the computer server 115 determines that user B has either signed into or signed up for the content streaming service platform, the exemplary process flow 200 proceeds to block 225, where the invite request is authorized by the computer server 115, and where the computer server 115 determines that an active user profile exists for user B. If the computer server 115 determines that user B has not signed into or signed up for the content streaming service platform, the exemplary process flow 200 proceeds to block 235, where the computer server 115 declines to connect user B to the virtual media streaming session.

In exemplary flow 200, upon authorizing the invite request at block 225, the computer server 115 may prompt user B to either accept or reject the invite request from user A at block 240. If user B accepts the invite request at block 240, the exemplary process flow 200 proceeds to block 245, where the computer server 115 connects user B's user profile to the virtual media streaming session (hosted by user A). If however, user B declines (e.g., rejects) the invite request at block 240, the exemplary process flow 200 proceeds to block 235, where the computer server 115 does not connect user B's user profile to the virtual media streaming session.

FIGS. 3-7 depict exemplary interactive graphical user interfaces (GUIs) 300-700 for initiating and inviting one or more other individuals (e.g., users 102, shown in FIG. 1) to a virtual media streaming session for synchronous transmission of multimedia content to a group of user devices, according to one or more embodiments of the present disclosure. Exemplary GUIs 300-700 may be generated by the computer server 115 for display at the first user's user computing device 105 (shown in FIG. 1), such as the first user's TV or personal laptop.

Figure 3:
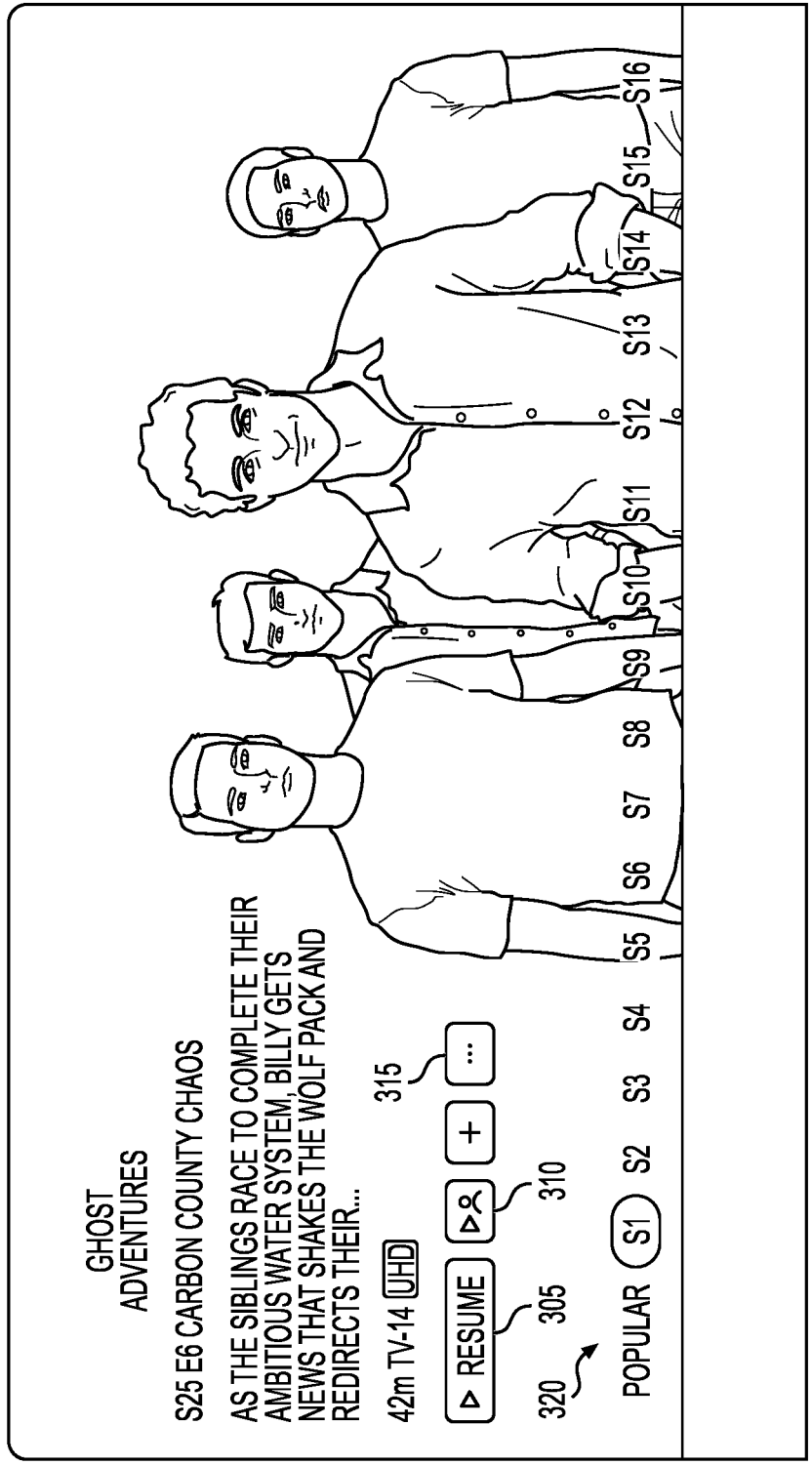
FIG. 3 depicts an exemplary interactive graphical user interface (GUI) for providing details of a multimedia content to be synchronously transmitted to a group of user devices, according to one or more embodiments.

In FIG. 3, exemplary GUI 300 depicts a details screen of a multimedia streaming application generated by the computer server 115. As shown in exemplary GUI 300, the details screen identifies the multimedia content item to be synchronously viewed (e.g., as part of a watch party in a virtual media streaming session, as described above with respect to FIG. 2), which in this use-case is a show with multiple seasons 320. The details screen includes a first icon 305 configured to allow the first user to start watching or resume watching an episode within the show, a second icon 310 configured to allow the first user to watch an episode with others at the same time, and a third icon 315 configured to allow the first user to view additional options. In one example, the first user may be excited about the show depicted in the details screen, and may want to view episodes of the show with one or more of their friends so that they can talk about the show together and share in the excitement. In such a situation, the first user may select the second icon 310 to start the process of sending an invite request to their friend(s).

Figure 4:
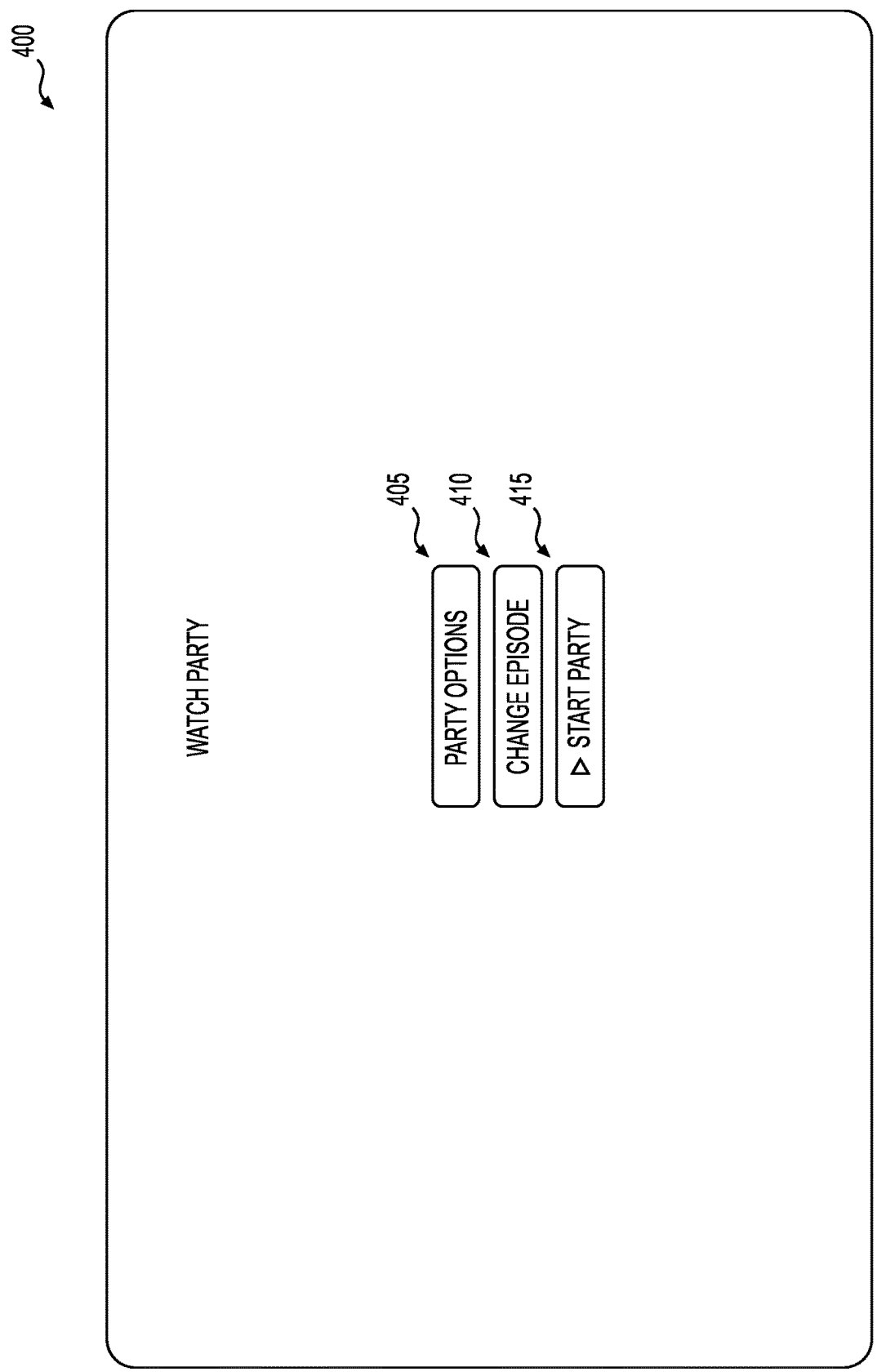
FIG. 4 depicts an exemplary interactive graphical user interface (GUI) for providing different options to a user when the user selects to initiate a "virtual watch party," for synchronously transmitting content to a group of user devices linked by user profiles, according to one or more embodiments.

In FIG. 4, exemplary GUI 400 depicts a "watch party initiation" screen that provides different options to the first user when the user selects the second icon 310 (shown in FIG. 3) to initiate a virtual media streaming session in which the show provided in exemplary GUI 300 can be synchronously viewed by a watch party. The different options include a "Party Options" icon 405, which is configured to provide the host user with additional settings adjustment options to optimize the shared viewing experience, as later described herein and as further illustrated in FIG. 6. The different options also include a "Change Episode" icon 410, which is configured to allow the host user to confirm that they have the desired episode selected and/or to enable the user to easily switch episodes without ending the watch party, as later described herein and as further illustrated in FIG. 7. The different options also include a "Start Party" icon 415, which is configured to provide an indication to the server 115 to initiate a group watch party via creation of a virtual media streaming session.

Figure 5:
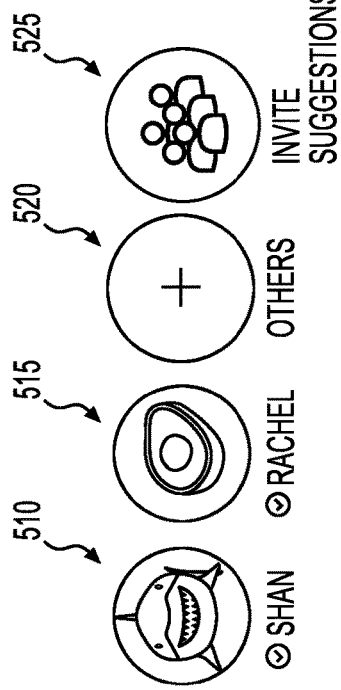
FIG. 5 depicts an exemplary interactive graphical user interface (GUI) for selecting one or more users to invite to the "virtual watch party," for synchronously transmitting content to a group of user devices linked by user profiles, according to one or more embodiments.

In FIG. 5, exemplary GUI 500 depicts an invite screen that appears when the first user selects the "Start Party" icon 415 (shown in FIG. 4). From this screen, the user may select one or more users to invite to the virtual media streaming session to synchronously view the desired article of multimedia content. The invite screen depicted in exemplary GUI 500 provides profile icons 510, 515 for those users with whom the first user is already linked together via the profile linking process described above in FIG. 2. As shown in exemplary GUI 500, profile icon 510 is associated with a user profile for a user named Shan, and profile icon 515 is associated with a user profile for a different user named Rachel. A checkmark accompanies each user's name underneath their respective profile icon 510, 515 to indicate that these user profiles are designated as "friends" or "contacts" in a friends list of the first user. Additionally, exemplary GUI 500 includes an "others" icon 520, which is configured to allow the first user to search for and send an invite request to a user whose user profile is not shown in GUI 500 (e.g., a user whose profile is not linked with the first user's profile). In one example, the first user may select one or both of the profile icons 510, 515 and then select an "Invite now" icon 530 to invite Shan and/or Rachel to the virtual media streaming session.

Additionally, still referring to FIG. 5, exemplary GUI 500 includes an "Invite suggestions" icon 525, which is configured to dynamically recommend one or more other individuals that the host user may want to invite to the watch party. More particularly, given access to the past viewing history of other individuals, the computer server 115 may be able to identify those individuals that may be interested in viewing the synchronous article of multimedia content based upon an analysis of the theme, genre, and/or content type associated with the past articles of multimedia content they historically enjoy viewing. For example, responsive to identifying that the synchronous article of multimedia content is associated with an action/adventure show, an embodiment may provide one or more invite suggestions to the host user, wherein each of the suggested invitees may have a history of watching action/adventure themed movies and/or series. In another embodiment, the computer server 115 may further tailor its suggestions by only recommending those individuals that may be able to achieve a complete viewing of the synchronous article of multimedia content. Specifically, the computer server 115 having access to calendar/schedule information of one or more other individuals may be able to determine whether those individuals have time to join the watch party. For example, responsive to identifying that the runtime for a synchronous article of multimedia content is approximately 45 minutes, the computer server 115 may recommend that the host user invite individual X, who is determined to have no scheduled events for the afternoon, but not individual Y, who is determined to have a scheduled meeting in 20 minutes.

Figure 6:
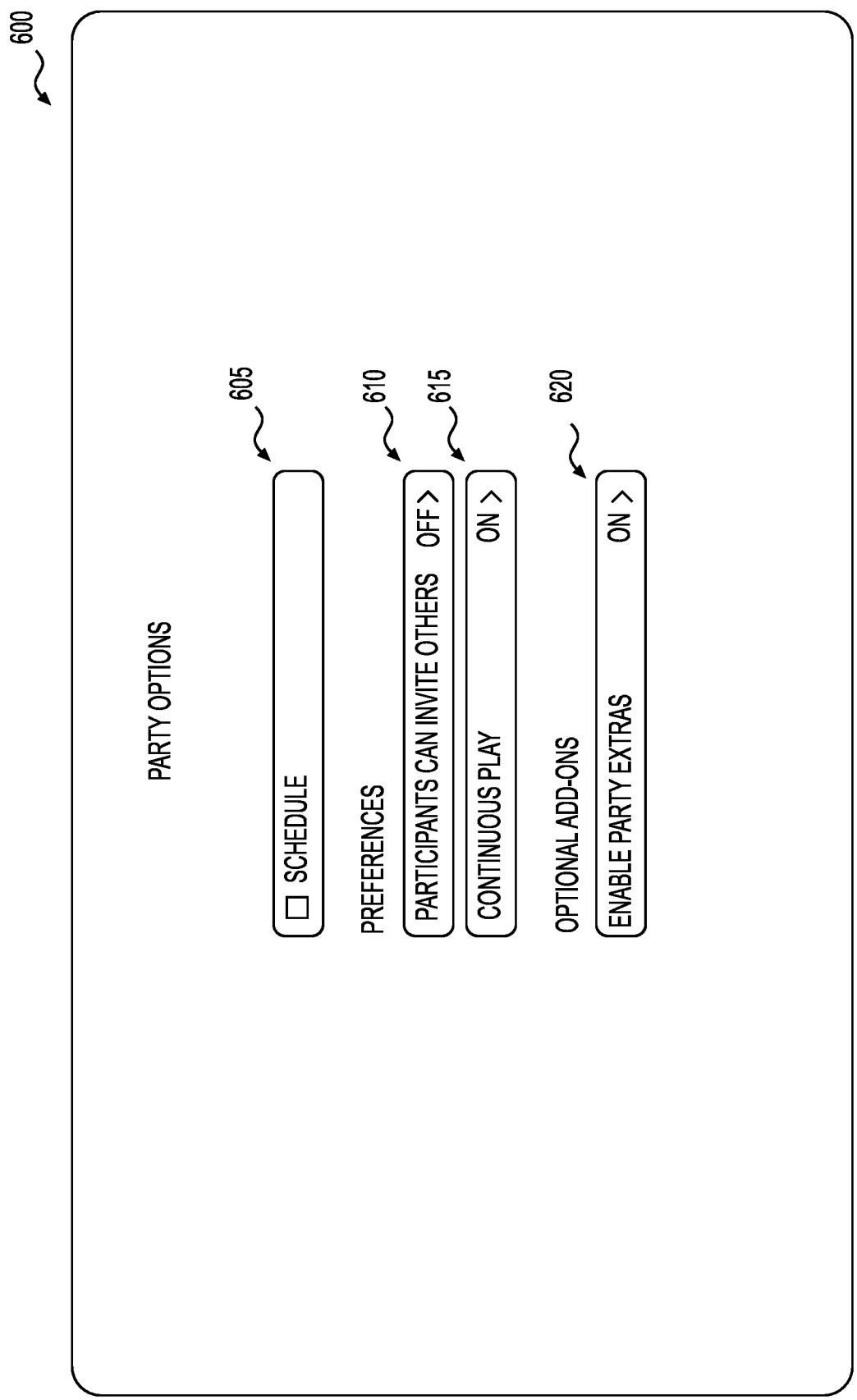
FIG. 6 depicts an exemplary interactive graphical user interface (GUI) for providing different options to a user to customize the "virtual watch party," for synchronously transmitting content to a group of user devices linked by user profiles according to one or more embodiments.

In FIG. 6, exemplary GUI 600 depicts a party options screen that appears when the host user selects the "party options" icon 415 (shown in FIG. 4). The party options screen provides a variety of different options the host user may interact with to customize various features associated with the watch party. For instance, one of the options includes a "scheduling" icon 605, which is configured to enable the host user to schedule a watch party for a future date and time. Upon selection of the "scheduling" icon 405, the host user may manually schedule an upcoming watch party (e.g., based upon availability input received from the other participants in the watch party). Alternatively, upon selection of the "scheduling" icon 405, the host user may be presented with one or more dynamically determined suggestions for upcoming watch party dates. More particularly, given access to availability information associated with the watch party participants (e.g., calendar data, communication data, social media data, a combination of any of the foregoing, etc.) the computer server 115 may be able to dynamically identify an upcoming date and time that works best for the watch party participants to engage in another shared viewing experience. Another option includes a "participant invite permissions" icon 610, which, when toggled, is configured to enable the participants in the watch party to further invite other individuals (e.g., using the means described above with reference to FIG. 5). Yet another option includes a "continuous play" icon 615, which, when toggled, is configured to play another article of multimedia content (e.g., the next episode in a series) when the current article of multimedia content has concluded. Yet another option includes a "party extras" icon 620, which is configured to enable various additional features that may augment the shared viewing experience.

Figure 7:
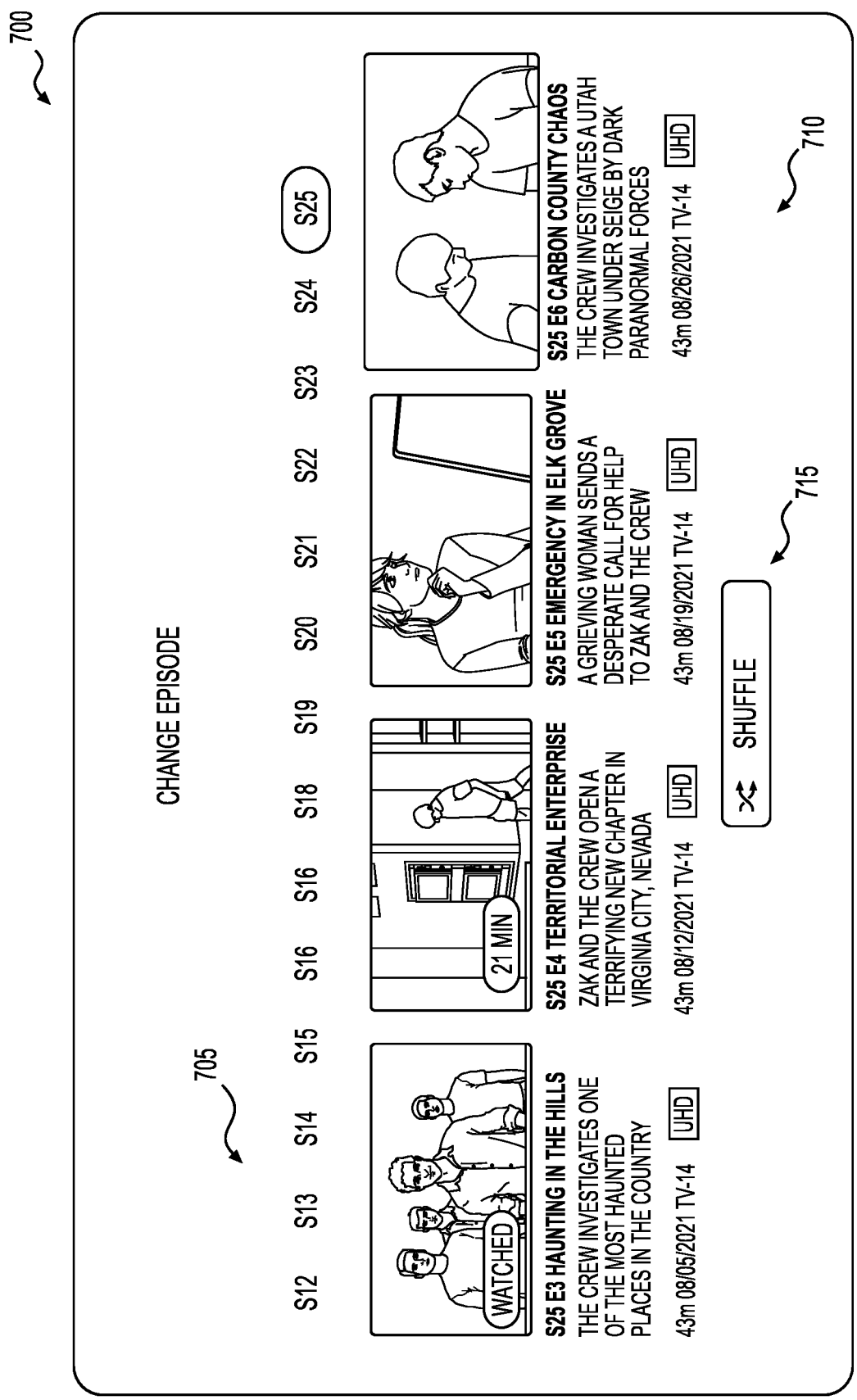
FIG. 7 depicts an exemplary interactive graphical user interface (GUI) for selecting an article of multimedia content to be synchronously presented during the "virtual watch party," according to one or more embodiments.

In FIG. 7, exemplary GUI 700 depicts a party options screen that appears when the host user selects the "change episode" icon 410 (shown in FIG. 4). From this screen, a user may confirm that they have the desired article of multimedia content selected for synchronous viewing. Additionally, a host user may easily select another article of multimedia content to synchronously view without ending the existing watch party. For instance, in this use-case, a host user may be able to navigate between seasons 705 of a show to select a desired episode 710. Additionally or alternatively, a user may choose to randomize the selection of the article of multimedia content by, for example, selecting a "shuffle play" icon 715.

FIGS. 8-12 depict exemplary interactive graphical user interfaces (GUIs) 800-1200 for receiving a watch party invite request from a user (e.g., user 102, shown in FIG. 1) and engaging in a watch party, according to one or more embodiments of the present disclosure. More specifically, whereas FIGS. 3-7 depict the first user sending a watch party invite request to a friend, FIGS. 8-12 depict the first user receiving a watch party invite request from a friend. Exemplary GUIs 800-1200 may be generated by the computer server 115 for display at the first user's user computing device 105 (shown in FIG. 1), such as the first user's TV, personal laptop, or mobile device.

Figure 8:
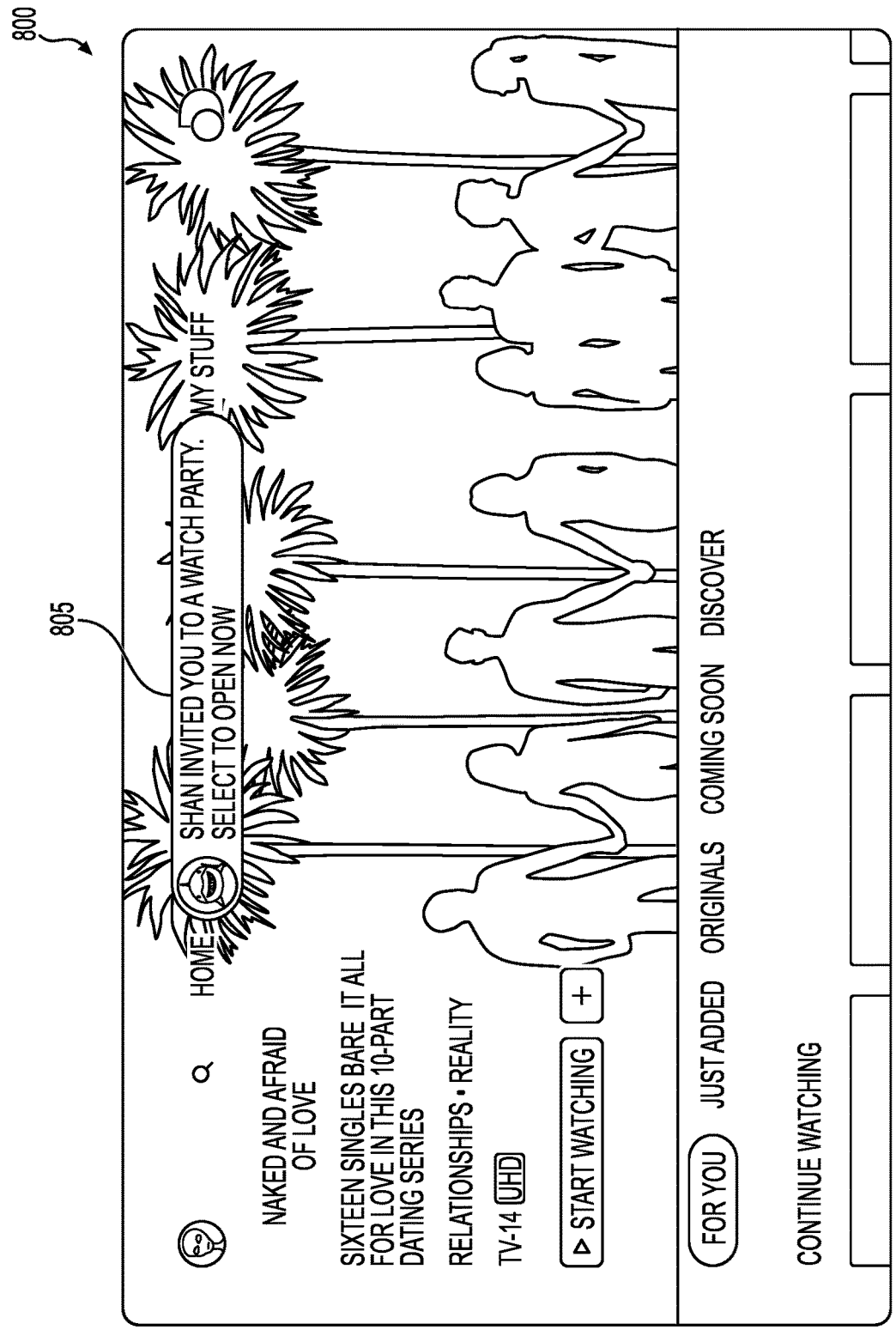
FIG. 8 depicts an exemplary interactive graphical user interface (GUI) for receiving a notification of a virtual watch party invite request, according to one or more embodiments.

In FIG. 8, exemplary GUI 800 depicts an in-app notification 805 that is displayed within the multimedia streaming app generated by the computer server 115. The notification 805 may be from another user profile on the same subscription account as the first user or from a linked profile. In exemplary GUI 800, the notification 805 alerts the first user that "Shan invited you to a watch party," and instructs the first user to select the notification 805 to open and view additional information associated with the invitation. The first user may select the notification 805 right away with, for example, an input device, such as a remote control, to view the content recommendation. Additionally or alternatively, the first user notification 805 may view the notification 805 at a later time by accessing a "notifications" tab (not shown). It is important to note that although the notification 805 illustrated here is a visual notification, such a notification type is not limiting. More particularly, an invite recipient may be apprised of the invite request via an audible notification (e.g., an audible message played through speakers associated with the invite recipient's device), a haptic notification (e.g., haptically represented Braille characters), any combinations of the foregoing, and other notification types not explicitly listed here.

Figure 9:
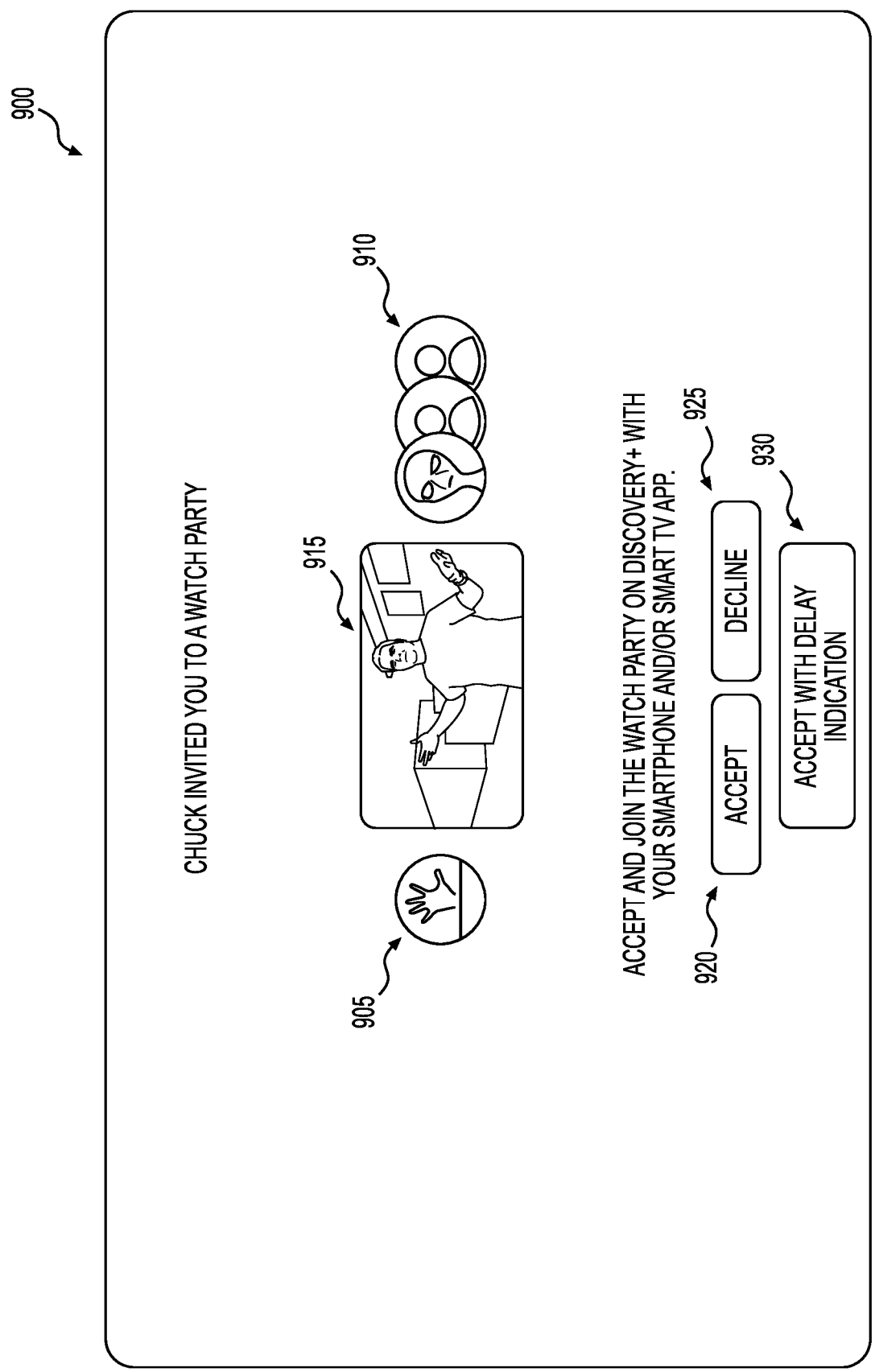
FIG. 9 depicts an exemplary interactive graphical user interface (GUI) for responding to a virtual watch party invite request, according to one or more embodiments.

In FIG. 9, exemplary GUI 900 depicts an invite screen that appears when the first user selects the notification 805 (shown in FIG. 8) to view the invite request. The invite screen may contain an indication of the identity of the individual 905 who has invited the first user to the watch party and/or may contain an indication of the identity of other individuals 910 that have also been invited to the watch party. The invite screen may also include a title 915 (and/or logo) of the article of multimedia content to be viewed in the watch party. In an embodiment, the invite screen may contain options for responding to the invite request. For example, an "accept" icon 920 is configured to enable the first user to accept the invite request and join the watch party. As another example, a "decline" icon 925 is configured to enable the first user to decline the invite request. Selection of the "decline" icon 925 may trigger the system to send an automated message to the party host informing them that the first user has declined their invitation.

Additionally, still referring to FIG. 9, in yet another example, an "accept with delay indication" icon 930 may be present that is configured to enable the first user to accept the invite request and also specify a time until they will be ready to engage in the watch party. More particularly, situations may arise where the first user would want to participate in the watch party but may not be able to do so for a short period of time (e.g., 15 minutes, 30 minutes, etc.). Accordingly, selection of the "accept with delay indication" icon 930 may enable the first user to provide an indication to the party host of when they would be able to fully engage in the shared viewing experience (e.g., by selecting a time in a drop-down list that is generated in response to selection of the icon 930, by providing a time in an input field that is generated in response to selection of the icon 930, etc.). Receipt of such an indication by the party host may influence whether they choose to start the watch party immediately or wait until the first user is ready to engage.

Figure 10:
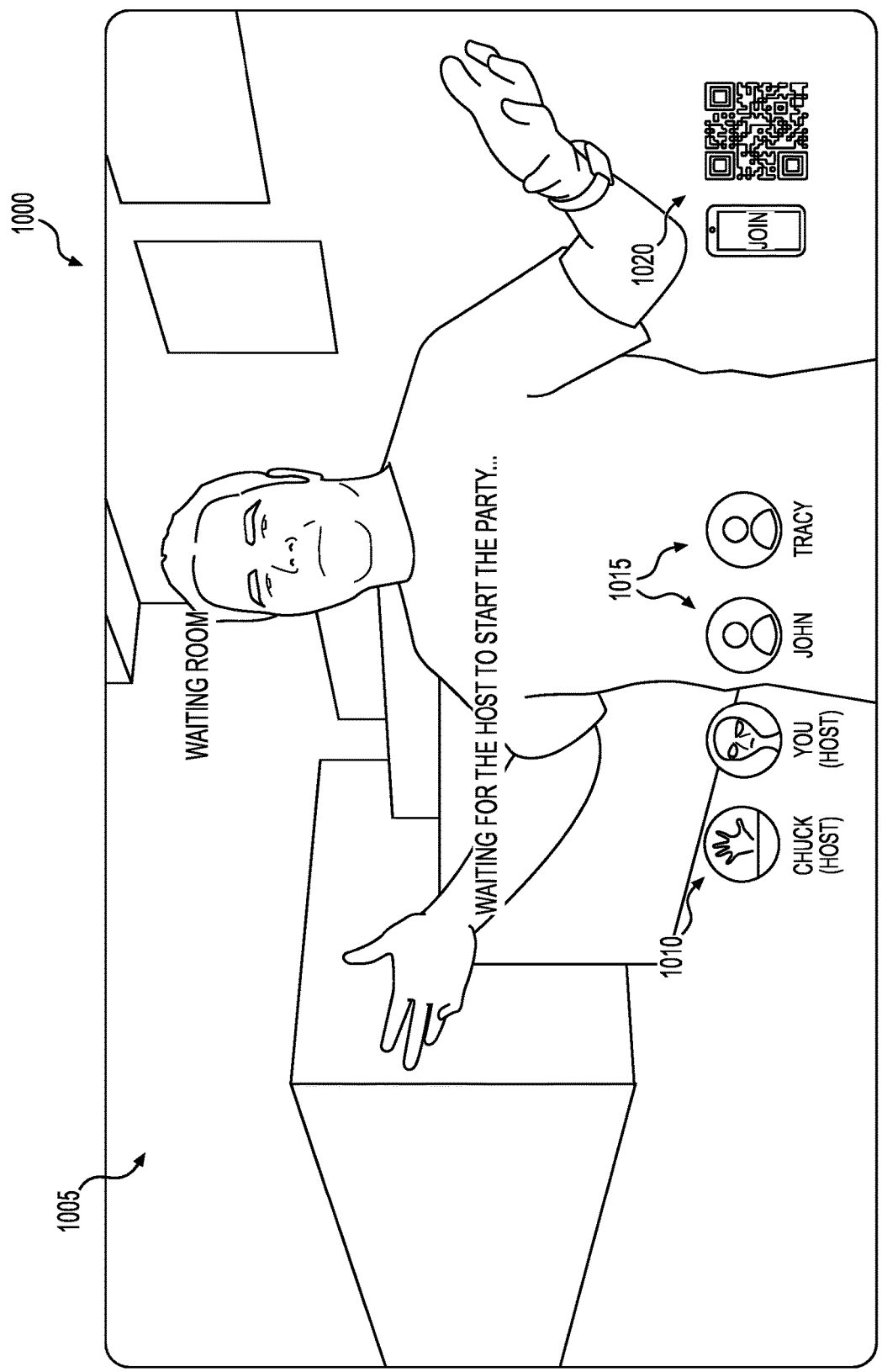
FIG. 10 depicts an exemplary interactive graphical user interface (GUI) of a watch party waiting room, according to one or more embodiments.

In FIG. 10, exemplary GUI 1000 depicts a waiting room screen that appears in response to selection of the "accept" icon 920 or "accept with delay indication" icon 930 (both shown in FIG. 9). This waiting room, or virtual lobby, may be an area where participants in the watch party may gather, chat, and wait for the synchronous article of multimedia content to start playing. From this screen, the first user may receive an indication of: the article of multimedia content 1005 to be synchronously viewed, the host 1010, and other participants 1015 to the watch party. Additionally, a "device transition" option 1020 may be presented to participants in the watch party (e.g., in a corner of the display screen). This option 1020 may enable a participant to activate the watch party, or features associated therewith, on another device. In the illustrated example, the "device transition" option 1020 may take the form of a QR code that the first user may scan with a second device they want to transition the watch party to (e.g., their mobile phone, tablet, etc.). Upon scanning the QR code, the watch party may dynamically activate on the second device assuming the second device has the appropriate capabilities and applications installed. Activation of the watch party on the second device may automatically disconnect the first user from the watch party on the first device or, alternatively, may maintain the first user's presence in the watch party on the first device.

Figure 11:
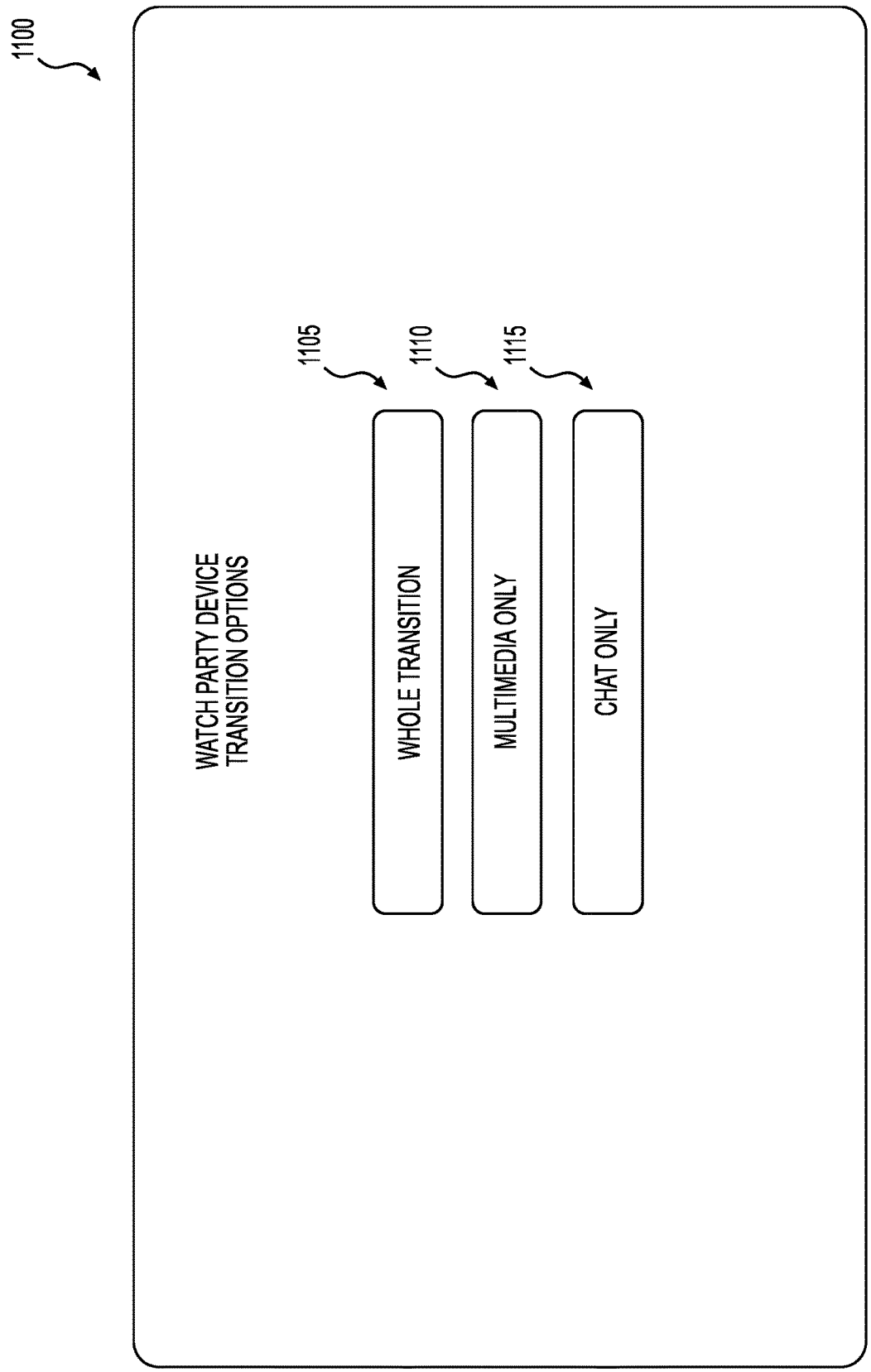
FIG. 11 depicts an exemplary interactive graphical user interface (GUI) for transitioning the watch party to another device, according to one or more embodiments.

Additionally or alternatively to the foregoing and with reference to FIG. 11, exemplary GUI 1100 depicts an options screen that is loaded on the second device in response to scanning of the "device transition" option 1020 in FIG. 10. This options screen may enable a user to select the features of the watch party they desire to have enabled on the second device. For instance, the options screen may contain a "whole watch party" icon 1105, which is configured to load each and every feature of the watch party (e.g., media-streaming and interaction capabilities) on the second device. As another example, the options screen may contain a "multimedia only" icon 1110, which is configured to present only the synchronous article of multimedia content that is being viewed by participants to the watch party on the second device. In yet another example, the options screen may contain a "chat only" icon 1115, which is configured to only enable chat functionality on the second device. Such a feature may be beneficial to "off load" the clutter from the first device (e.g., a television) by solely presenting the synchronous article of multimedia content on the first device while utilizing the second device (e.g., a mobile phone) to engage in chat. Such a feature may also be convenient in situations where other individuals are physically present with the first user. More particularly, the other, physically-present individuals may also scan the QR code manifest as the "device transition" option 1020 to be able to independently engage in the shared chat, as further described herein.

Figure 12:
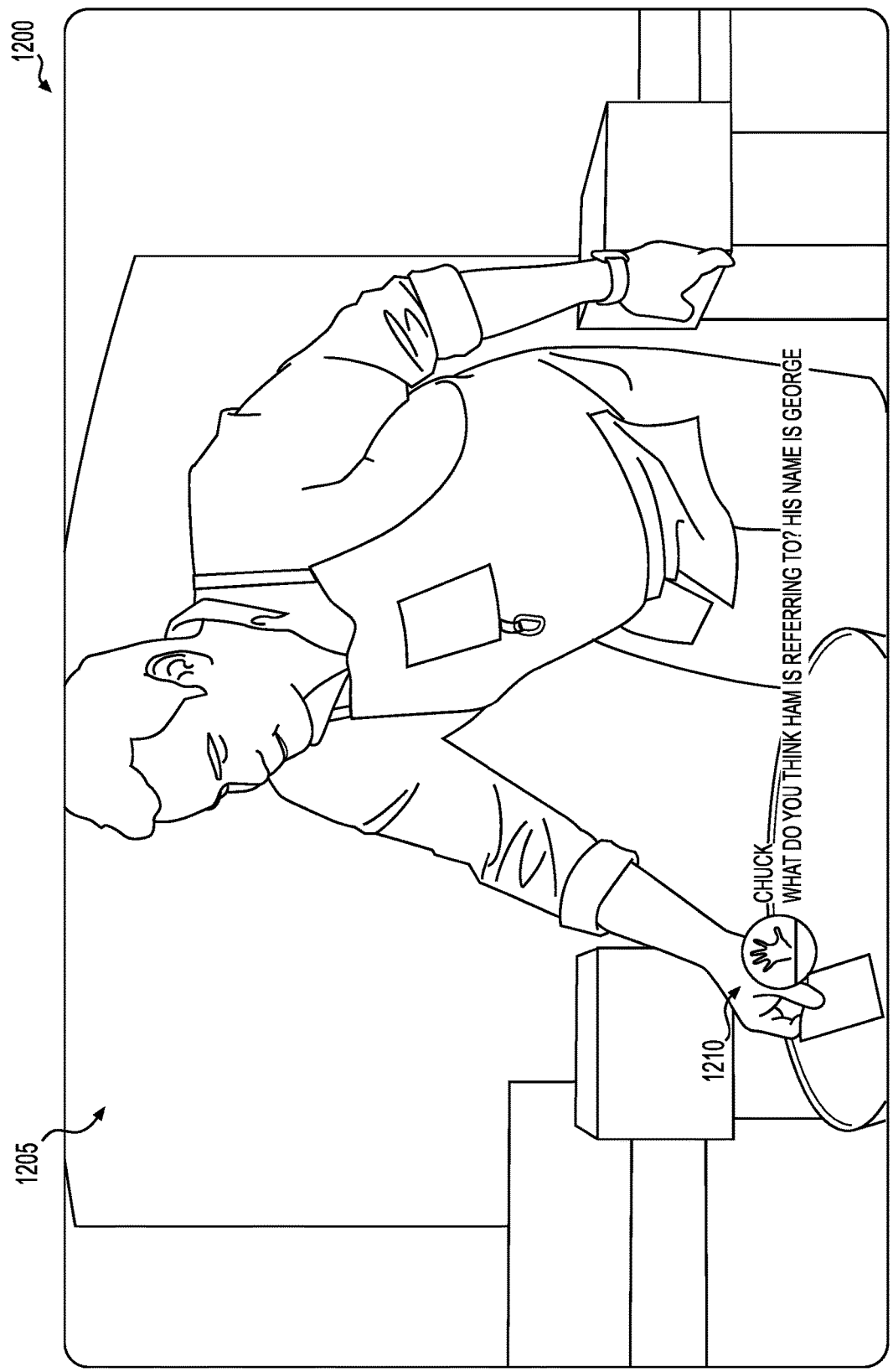
FIG. 12 depicts an exemplary interactive graphical user interface (GUI) of presenting synchronous multimedia content in a virtual media streaming session, according to one or more embodiments.

In FIG. 12, exemplary GUI 1200 depicts an example implementation of the watch party from the perspective of the first user participant. More particularly, the synchronous article of multimedia content 1205 may be prominently presented on a primary portion of a display of the first user's device. Additionally, each participant in the watch party may be able to provide comments 1210 and/or reactions (e.g., emoticon reactions, like/dislike indications manifest as thumbs up or down icons, etc.) that may be seen by others in the watch party.

Figure 13:
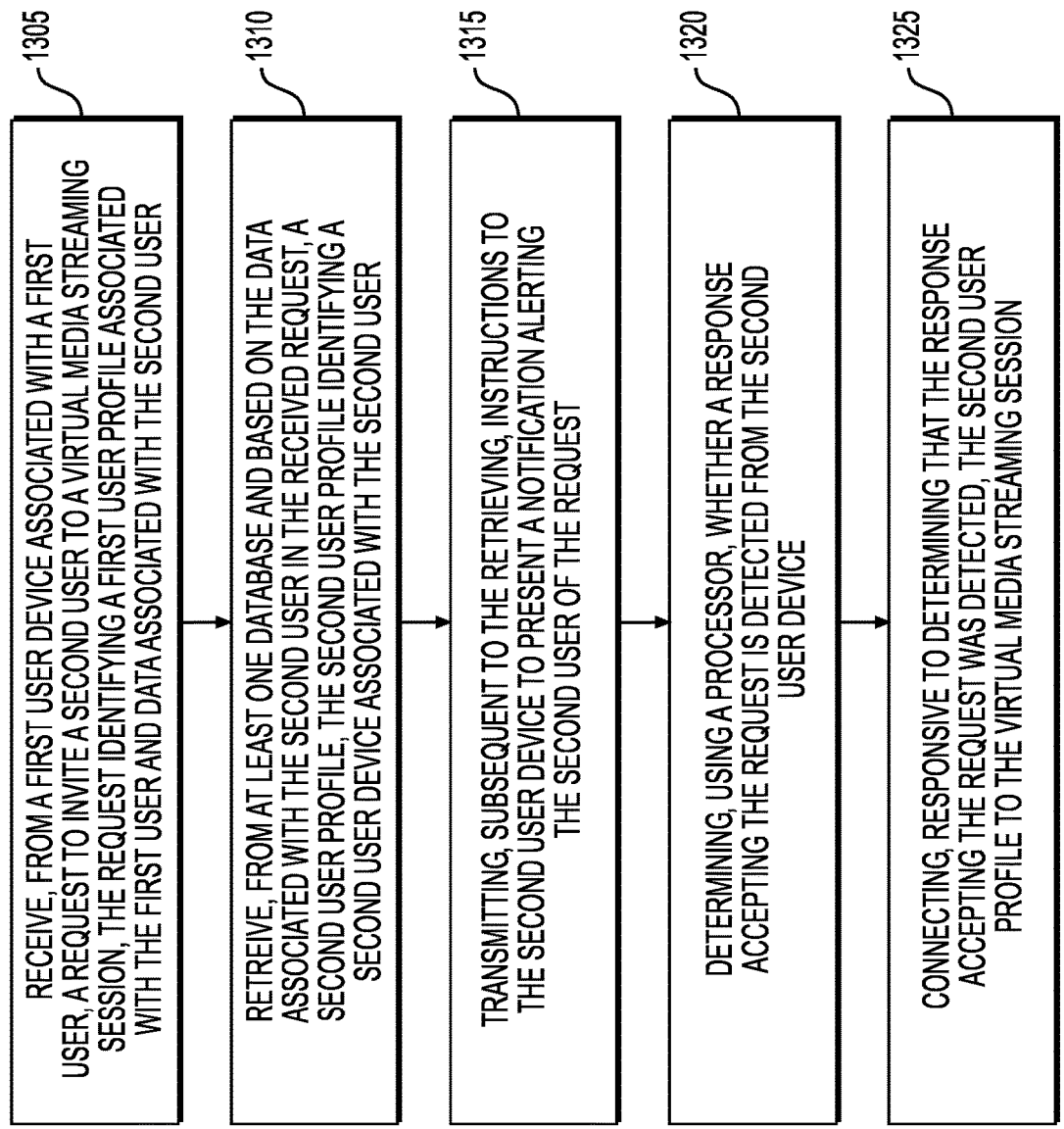
FIG. 13 depicts an exemplary flowchart of a method of providing synchronous consumption of streaming media, according to one or more embodiments.

FIG. 13 is a flowchart illustrating an exemplary method 1300 for synchronous consumption of streaming media, according to one or more embodiments of the present disclosure. The method 1300 may be performed by computer server 115 (shown in FIG. 1).

Step 1305 may include receiving, from a first user device (e.g., user computing device 105, shown in FIG. 1) associated with a first user, a request to invite a second user to a virtual media streaming session. The request may identify, among other things, a first user profile associated with the first user and data associated with the second user.

Step 1310 may include retrieving, from at least one database (e.g., interaction database 120, shown in FIG. 1), a second user profile associated with the second user based on the received request. The second user profile associated with the second user may identify a second user device (e.g., user computing device 105) associated with the second user. As described above, user profiles may include interaction data as well as any additional data received from user computing devices 105 (shown in FIG. 1), including, but not limited to data associated with one or more user computing devices 105 registered by the second user with the computer server 115.

Step 1315 may include transmitting, using the information retrieved about the second user in step 1310, instructions to a second user device (e.g., user computing device 105) associated with the second user to present a notification alerting the second user of the request. As described above with respect to FIG. 8, the second user may receive an in-app notification, such as notification 805 within the multimedia streaming application generated by the computer server 115.

Step 1320 may include determining, using a processor, whether the second user has accepted the invite request. As described above with respect to FIG. 9, the second user may choose to either accept the request (i.e., via selection of an "accept" icon 920, shown in FIG. 9), decline the request (i.e., via selection of a "decline" icon 925, shown in FIG. 9), or accept the request with a delay indication (i.e., via selection of icon 930, shown in FIG. 9). Responsive to receiving the selection of the second user, the computer server 115 may transmit the response of the second user back to the first user.

Step 1325 may include connecting the second user profile to the virtual media streaming session upon determining that an acceptance response was detected. The connection of the user profiles may be referred to as a "watch party" and multimedia content presented in the virtual media streaming session may be simultaneously viewable by all participants of the watch party. More particularly, each participant in the watch party may watch the same multimedia content independently from their own devices. Additionally, each participant in the watch party may provide input (e.g., comments or reactions) that may be visible to all members of the watch party. Additionally still, participants may transition one or more functional features of the watch party from an original device (e.g., a television) to a second device (e.g., a mobile device) without disrupting the watch party.

Further aspects of the disclosure are discussed in the additional embodiments below. It should be understood that embodiments in this disclosure are exemplary only, and that other embodiments may include various combinations of features from other embodiments, as well as additional or fewer features.

In general, any process discussed in this disclosure that is understood to be computer-implementable, such as the process illustrated in FIG. 13, may be performed by one or more processors of a computer server, such as computer server 115, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as computer server 115, may include one or more computing devices. If the one or more processors of the computer system are implemented as a plurality of processors, the plurality of processors may be included in a single computing device or distributed among a plurality of computing devices. If a computer server 115 comprises a plurality of computing devices, the memory of the computer server 115 may include the respective memory of each computing device of the plurality of computing devices.

FIG. 14 is a simplified functional block diagram of a computer system 1400 that may be configured as a computing device for executing the process illustrated in FIG. 13, according to exemplary embodiments of the present disclosure. FIG. 14 is a simplified functional block diagram of a computer that may be configured as the computer server 115 according to exemplary embodiments of the present disclosure. In various embodiments, any of the systems herein may be an assembly of hardware including, for example, a data communication interface 1420 for packet data communication. The platform also may include a central processing unit ("CPU") 1402, in the form of one or more processors, for executing program instructions. The platform may include an internal communication bus 1408, and a storage unit 1406 (such as ROM, HDD, SDD, etc.) that may store data on a computer readable medium 1422, although the system 1400 may receive programming and data via network communications. The system 1400 may also have a memory 1404 (such as RAM) storing instructions 1424 for executing techniques presented herein, although the instructions 1424 may be stored temporarily or permanently within other modules of system 1400 (e.g., processor 1402 and/or computer readable medium 1422). The system 1400 also may include input and output ports 1412 and/or a display 1410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to synchronous consumption of streaming media, it should be appreciated that the presently disclosed embodiments may be applicable to transmitting data and may be applicable to any environment, such as a desktop or laptop computer, a gaming console environment, and any CTV (connected TV) environment (e.g., an internet-connected device used to watch multimedia content items), etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the process shown in FIG. 13, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for synchronous transmission of streaming media using a server in network communication with at least one database, the method comprising operations including:
    connecting, using the server, a user profile of a user to a virtual media streaming session, wherein multimedia content presented in the virtual media streaming session is simultaneously viewable by each user profile connected to the virtual media streaming session;
    transmitting, from the server, instructions to a first user device associated with the user profile to present a transition option during display of the virtual media streaming session, wherein the transition option is configured to transition at least one feature of the virtual media streaming session to a second user device associated with the user upon selection;

receiving, at the server, an indication that the transition option was selected;

transmitting, from the server to the second user device, instructions to display an options screen comprising a plurality of selectable icons on the second user device, wherein each of the plurality of selectable icons is configured to transition the virtual media streaming session onto the second user device according to a transition protocol;

receiving, at the server, another indication that one of the plurality of selectable icons was selected;

identifying, at the server, the transition protocol associated with the selected one of the plurality of selectable icons; and transitioning, subsequent to the identifying, the at least one feature of the virtual media streaming session from the first user device to the second user device according to the identified transition protocol associated with the selected one of the plurality of selectable icons.

2. The method of claim 1, wherein the connecting comprises connecting the user profile to a virtual lobby of the virtual media streaming session.

3. The method of claim 1, wherein the transition option is a QR code configured to be scanned by a mobile device.

4. The method of claim 1, wherein the plurality of selectable icons in the options screen comprise: a whole transition icon, a multimedia-only transition icon, and a chat-only transition icon.

5. The method of claim 4, wherein the transition protocol associated with the whole transition icon is configured to load all features associated with the virtual media streaming session onto the second user device.

6. The method of claim 4, wherein the transition protocol associated with the multimedia only transition option is configured to only enable viewership of the streaming media on the second user device.

7. The method of claim 4, wherein the transition protocol associated with the chat-only transition icon is configured to only enable chat functionality on the second user device.

8. A system for synchronous transmission of streaming media, the system comprising:

at least one database;

a server in network communication with the at least one database, the server configured to perform operations including:

connecting, using the server, a user profile of a user to a virtual media streaming session, wherein multimedia content presented in the virtual media streaming session is simultaneously viewable by each user profile connected to the virtual media streaming session;

transmitting, from the server, instructions to a first user device associated with the user profile to present a transition option during display of the virtual media streaming session, wherein the transition option is configured to transition at least one feature of the virtual media streaming session to a second user device associated with the user upon selection;

receiving, at the server, an indication that the transition option was selected;

transmitting, from the server to the second user device, instructions to display an options screen comprising a plurality of selectable icons on the second user device, wherein each of the plurality of selectable icons is configured to transition the virtual media streaming session onto the second user device according to a transition protocol;

receiving, at the server, another indication that one of the plurality of selectable icons was selected;

identifying, at the server, the transition protocol associated with the selected one of the plurality of selectable icons; and transitioning, subsequent to the identifying, the at least one feature of the virtual media streaming session from the first user device to the second user device according to the identified transition protocol associated with the selected one of the plurality of selectable icons.

9. The system of claim 8, wherein the connecting comprises connecting the user profile to a virtual lobby of the virtual media streaming session.

10. The system of claim 8, wherein the transition option is a QR code configured to be scanned by a mobile device.

11. The system of claim 8, wherein the plurality of selectable icons in the options screen comprise: a whole transition icon, a multimedia-only transition icon, and a chat-only transition icon.

12. The system of claim 11, wherein the transition protocol associated with the whole transition icon is configured to load all features associated with the virtual media streaming session onto the second user device.

13. The system of claim 11, wherein the transition protocol associated with the multimedia only transition option is configured to only enable viewership of the streaming media on the second user device.

14. The system of claim 11, wherein the transition protocol associated with the chat-only transition icon is configured to only enable chat functionality on the second user device.

15. A non-transitory computer-readable medium storing computer-executable instructions which, when executed by a server in network communication with at least one database, cause the server to perform operations comprising:

connecting, using the server, a user profile of a user to a virtual media streaming session, wherein multimedia content presented in the virtual media streaming session is simultaneously viewable by each user profile connected to the virtual media streaming session;

transmitting, from the server, instructions to a first user device associated with the user profile to present a transition option during display of the virtual media streaming session, wherein the transition option is configured to transition at least one feature of the virtual media streaming session to a second user device associated with the user upon selection;

receiving, at the server, an indication that the transition option was selected;

transmitting, from the server to the second user device, instructions to display an options screen comprising a plurality of selectable icons on the second user device, wherein each of the plurality of selectable icons is configured to transition the virtual media streaming session onto the second user device according to a transition protocol;

receiving, at the server, another indication that one of the plurality of selectable icons was selected;

identifying, at the server, the transition protocol associated with the selected one of the plurality of selectable icons; and transitioning, subsequent to the identifying, the at least one feature of the virtual media streaming session from the first user device to the second user device according to the identified transition protocol associated with the selected one of the plurality of selectable icons.

16. The non-transitory computer-readable medium of claim 15, wherein the transition option is a QR code configured to be scanned by a mobile device.

17. The non-transitory computer-readable medium of claim 15, wherein the plurality of selectable icons in the options screen comprise: a whole transition icon, a multimedia-only transition icon, and a chat-only transition icon.

18. The non-transitory computer-readable medium of claim 17, wherein the transition protocol associated with the whole transition icon is configured to load all features associated with the virtual media streaming session onto the second user device.

19. The non-transitory computer-readable medium of claim 17, wherein the transition protocol associated with the multimedia only transition option is configured to only enable viewership of the streaming media on the second user device.

20. The non-transitory computer-readable medium of claim 17, wherein the transition protocol associated with the chat-only transition icon is configured to only enable chat functionality on the second user device.

\* \* \* \* \*